Patented Sept. 6, 1949

2,481,353

UNITED STATES PATENT OFFICE 2,481,353

METHOD OF MANUFACTURING VITAMIN CONCENTRATES

Lewis Wilson Schnabel, Kansas City, Kans.

No Drawing. Application October 25, 1946, Serial No. 705,818

9 Claims. (Cl. 167—81)

This invention relates to vitamin concentrates and more particularly to vitamin concentrates derived from green leaves and certain other types of vegetation.

Among the several objects of this invention may be noted the provision of concentrates which are inexpensive sources of vitamins; the provision of concentrates which are inexpensive sources of proteins; the provision of a method of manufacturing concentrates of the class indicated from green leaves and other types of vegetation with a high yield in vitamin content in a simple, efficient and economical manner; and the provision of a method for extracting, and for concentrating vitamin C and other reducing substances from green leaves and the like without any appreciable loss in vitamin content. Other objects will be in part apparent and in part pointed out hereinafter.

The invention accordingly comprises the ingredients and combinations of ingredients, the proportions thereof, steps and sequence of steps, and features of composition and synthesis, analysis, or metathesis, which will be exemplified in the products and processes hereinafter described, and the scope of the application of which will be indicated in the following claims.

Vitamin A, vitamin C and good quality protein are among the most expensive factors in the human diet. Diets based on natural foods which will supply the necessary amount of these key food factors in addition to the calorie requirements are relatively costly because of the inherent expense of the sources from which these particular vitamins and proteins are now obtained. It is well known that the calorie content in the human diet can be inexpensively supplied so that if a cheap source of vitamins A and C and of protein could be found, an adequate diet could be inexpensively provided.

Although the cost factor is of importance there are other factors to be considered. Two such factors are availability and present need. Grasses, green leaves and other vegetation such as mustard greens and alfalfa are all inexpensive and easy to grow. There is practically no limitation as to the locality in which these various plants may be found and as a result they are not only available in practically any part of the world at nominal cost, but they are also readily available in large quantities. The need for inexpensive and readily available substances of high nutritive value is now a major problem of world wide import.

In accordance with the present invention very inexpensive concentrates containing essential food factors have been devised that will supply an optimum of these necessary vitamins and protein at nominal cost. A basic problem in vitamin science today is the efficient extraction of such vitamins from plant life. Vitamins are extremely sensitive to many physical and chemical conditions including heat, light, oxidation and pulverizing and to get a good yield of vitamins from commercial extraction processes is exceedingly difficult. Vitamin C, while in an aqueous solution for example, is adversely affected by air and agitation and the vitamin content decreases very rapidly during such processing. It has been found that green leaves and certain other types of vegetation referred to subsequently, if treated in accordance with the present invention, especially if cut at the proper stage of growth, will yield a vitamin concentrate containing among other nutritive substances, a high percentage of vitamin C.

Some method or means for preventing the loss of vitamin content during an extraction process is the first requirement in producing inexpensive vitamin concentrates. Oxalic acid has been used, but it is not only highly objectionable in all types of food products and difficult to remove therefrom, but it is also inefficient as an agent to prevent vitamin C loss during extraction and concentration. Many substances other than oxalic acid have been tried as to their preservative effect during extraction and concentration without success.

It has been found in accordance with the present invention that the introduction of certain substances, namely sulfur dioxide, hydrogen sulfide and nascent hydrogen will prevent any great loss in vitamin C content during extraction and concentration. The theory behind the action of these three agents is more a matter of conjecture than of fact at the present time. It may well be due to some reaction of these agents with vitamin C. If it is assumed that deterioration is caused by a substitution at the double bond in ascorbic acid by oxygen or an oxidation reaction of some sort, and that the introduction of sulfur dioxide, hydrogen sulfide or nascent hydrogen will prevent this substitution or oxidation, these compounds may be called preserving agents and for simplicity they are so designated hereinafter.

Green leaves and other green surface vegetation such as succulent fruits and vegetables, including peaches, oranges, lemons, green peppers, tomatoes, head lettuce, cabbage, potatoes, cauliflower and carrots, contain besides vitamin C, other substances which are susceptible to heating and extracting processes. It has been found that these substances which we will call reducing substances, are also protected during extraction and concentration by the above-mentioned agents.

The preparation of the concentrates of the present invention involves the extraction of the desired components of the green leaves or other green surface vegetation and concentration of the extract. The first step is that of comminuting and agitating the green leaves or other vegetation in a quantity of water in intimate relation with one of the above preserving agents. The resulting slurry from this comminuting and agitating step is filtered to remove the fiber component which may be used for animal feed, as a further source of protein for further extraction, as a fertilizer high in potassium and phosphorus, or as a base for making wallboard.

If the filtrate resulting from this process is at a pH of approximately 3 to 6, a green chlorophyll-protein coagulate will form together with a white albuminoid coagulate and these intermixed coagulates may be separated out by heating, filtration, centrifuging or merely settling. These intermixed coagulates may also be separated from each other in a separate process if desired or they may be used together as a vitamin concentrate containing a high percentage of vitamin A-forming substances, other fat soluble vitamins, and proteins including albuminoids. If the pH of the filtrate is maintained at a value greater than about 6 the green and the white coagulates may be separated by heating, the chlorophyll-protein coagulate separating at a lower temperature than the white albuminoid coagulate. If the pH is below a value of approximately 3 the green and white coagulates will remain in the filtrate without separation.

In this way either the green or white coagulate or both together may be separated and concentrated into vitamin concentrates containing vitamin A, other fat soluble vitamins and proteins, and albuminoids. By separating out the coagulates together, a single vitamin concentrate may be made which contains all of the vitamins and proteins present in both the green and white coagulates. The filtrate after removal of the green and white coagulates contains vitamin C and certain reducing substances. If these green and white coagulates are not removed (as noted above where the pH value is maintained below about 3), a vitamin concentrate may be made containing vitamin C, vitamin A, other fat-soluble vitamins, proteins and albuminoids. The pH relationships used in the above description will hold true generally but, as will be seen in the following examples, there are slight variations from these values for each specific preserving agent used, and there will be an optimum pH for each preserving agent.

The filtrate remaining after the indigestible fiber has been removed (and also the green and/or white coagulates if their removal is desired) may then be concentrated by evaporation to such volume as desired, the final concentrate containing the desired percentages of the vitamins and proteins.

The temperature at which the extracting process is carried out should be maintained at a value as low as is practicable, the upper limit of this temperature being approximately 120° F. By maintaining the extracting temperature at a low value a sufficient concentration of the preserving agent will be maintained to protect the vitamin C and reducing substances. A further advantage of extraction at low temperatures is to increase the yield of the green coagulate precipitate. If the temperature is too high the green precipitate will form in large particles, adhere to the fiber and be removed with the fiber in the first filtering process. The preserving agents used should be introduced in such a manner as to be thoroughly distributed throughout the mixture. The pH should be kept between limits determined by the particular preserving agents used. Generally speaking, however, if the pH is above a value of about 6.0 the green chlorophyll-protein coagulate will not properly separate without heat, and if the pH is below a value of approximately 3.0, extraction and concentration will also be adversely affected.

In the following examples alfalfa leaves have been used as the source of the novel vitamin concentrates of the present invention. Alfalfa is a good example of an inexpensive source of vitamins and proteins and has an approximate analysis of 80% moisture, 20% solids. These solids contain 50% indigestible fiber and a maximum of 1½% vitamin C. It will be understood that legumes, grasses, green leaf vegetables, and succulent fruits and vegetables may also be used as starting substances.

Another object of my invention is the almost complete prevention of non enzymatic browning of food stuffs which is caused at least in part by chemical reactions involving, (1) caramel substances consisting of complex sugar anhydrides, (2) melanoidins formed by the effect of heat on the initial condensation products of reducing sugars with amino acids and their amides, (3) iron compounds of polyphenols.

The water soluble concentrate from a water extraction of green leaves turns almost black when it is boiled down to even 50% solids in the open while the sulfur dioxide extract from the same material remains a light amber color even when evaporated to dryness in the open.

The prevention of non enzymatic browning probably contributes to the greater stability of the reducing substances in the concentrates from the $SO_2$ extractions. Boiling down the filtrate under vacuum enhances the protective effect of the $SO_2$.

The following examples are illustrative only:

*Example 1*

Step 1.—In commercial practice about two tons of fresh grass or alfalfa leaves are run through an ensilage cutter into a 3000 gallon tank of the Waring Blendor type and disintegrated with four to five tons of water into which sulfur dioxide is bubbled to maintain the pH of the disintegrating mixture at about 4.0. The disintegration is completed in about five minutes.

Step 2.—The slurry from step one is pumped through a coarse filter press where the fiber is removed and pressed to a solids content of about 50%. This fiber contains some protein which can be removed by step 7 (below) if desired.

Step 3.—The green coagulate containing about 90% of the carotene of the original material is then separated from the filtrate of step 2 by centrifugal force or other means without heating.

Step 4.—The clear filtrate from step 3 is used in lieu of the water in step 1 for disintegrating another fresh batch, enough $SO_2$ being bubbled in to keep the pH about 4.0, until its solids content is raised to about 10% whereupon it is boiled down to a solids content of about 50%. In this condition the concentrate is stable and can be stored to await final evaporation to dryness, by spray drying for example if desired.

Step 5.—During the boiling down of the filtrate from step 4 a white coagulate containing from 50% to 60% ash is thrown out of solution and can be filtered out before the final evaporation of the concentrate to dryness.

Step 6.—Both the green coagulate from step 3 and the white coagulate from step 5 can be pressed into cakes containing about 50% solids but if the remaining moisture is to be removed this must be done at a low temperature, preferably under vacuum or a reducing atmosphere.

Step 7.—The fiber from step 2 may be reextracted in a Waring Blendor with a dilute alkali, preferably KOH about 0.1 N or less, and the fiber again separated as in step 2. This filtrate can also be used over and over again until the solids are built up to the desired point whereupon it is neutralized, for example with phosphoric acid, to the isoelectric point of the dissolved proteins. The precipitated proteins are then filtered out, pressed and dried. If the final filtrate and fiber from step 7 are not needed for other purposes, they make an excellent fertilizer.

The final water soluble concentrate from step 5 contains virtually all of the vitamin C and other reducing substances of the original material. When top quality grass or alfalfa is used as the starting material this concentrate will contain about 5.0% vitamin C which is three to ten times its concentration in the fresh leaf. In addition it contains from 60% to 70% of the mineral content of the leaf and 10% to 20% of the protein but only 15% to 35% of the total dry matter of the original material. The advantages of the present invention are all the more apparent when it is realized that this water soluble concentrate contains from 25% to 200% more vitamin C per gram of dry matter than an oxalic acid extract of the same material.

One of the important features of my invention is the preservation of highly labile reducing substances in the fresh leaf which are destroyed by known methods of processing. In fact ordinary methods of testing do not reveal the presence of these substances. The total reducing substances in green leaves, calculated as vitamin C, range from five to ten times the amount of vitamin C shown by the usual methods of analysis. These reducing substances seem important for optimum human or animal nutrition.

The green coagulate from step 3, when made from top quality grass or alfalfa contains about one million units of vitamin A per pound and 50% protein on a dry basis, beside the other fat soluble vitamins associated with carotene.

The white coagulate from step 5 contains from 50% to 60% ash on a dry basis. There is very little of this coagulate in the more mature grass and alfalfa.

Thus my invention provides a cheap mass production method for preserving the transient nutritional value of young green leaves when they are at the peak of their quality. The various fractions mentioned above cannot be separated from the fiber after dehydration of the whole leaf.

Example 2

25 grams of fresh alfalfa leaves are disintegrated in 225 cc. of water in a Waring Blendor and the fiber screened out. Hydrogen sulfide is bubbled in during the disintegration period of about three minutes, the pH being maintained between 4.0 and 8.3 and the temperature being maintained below 120° F. The green coagulate is removed by heating the filtrate to about 130° F. and filtering. This green coagulate contains about 50% protein and from five hundred thousand to one million units of vitamin A per pound on a dry basis, depending on the quality of the fresh material.

When the filtrate is heated to about 160° F. a white coagulate is formed which contains about 70% protein. When the filtrate from this operation is boiled down to about 50% solids it contains from 2% to 4% of vitamin C on a dry basis, depending on the quality of the fresh material. When the original filtrate is heated to 160° F. at once, both the green and the white coagulates come down together and cannot be separated.

Example 3

25 grams of fresh alfalfa leaves are disintegrated in a metal tank in contact with 225 cc. of water. Nascent hydrogen is generated throughout the disintegration period by electrolysis and continuously and thoroughly dispersed throughout the extracting fluid during disintegration. This nascent hydrogen was generated by making the cutting knives of the disintegration or comminuting device a negative electrode and introducing a covered positive electrode at the surface of the liquid. In this way the oxygen generated is conducted away from the solution by means of the covered positive electrode. The pH is kept below a value of 4.0. The pH should be kept as low as possible without rendering the green chlorophyll-protein coagulate uncoagulatable by heat. The indigestible fiber is removed by filtration. If the disintegration is carried out at a pH of 3.5 to 4.5 the green coagulate can be separated by filtering without heating. At a pH above 4.0 it is hard to get enough nascent hydrogen generated to preserve the vitamin C. The white coagulate in the nascent hydrogen extraction, forms on boiling down the concentrate as in the $SO_2$ extraction (Example 1).

The water soluble concentrate from the nascent hydrogen extraction contains from 2% to 4% vitamin C on a dry basis, depending on the quality of the fresh material.

In lieu of nascent hydrogen, sulfur dioxide or hydrogen sulfide alone, combinations of nascent hydrogen and sulfur dioxide or hydrogen sulfide may be used. It has also been found that sulfur dioxide does not have to be bubbled in continuously during the extraction process but will work satisfactorily if it is introduced prior to the extraction process.

In view of the above, it will be seen that the several objects of the invention are achieved and other advantageous results attained.

As many changes could be made in the above processes and products without departing from the scope of the invention, it is intended that all matter contained in the above description shall be interpreted as illustrative and not in a limiting sense.

I claim:

1. The process of manufacturing vitamin concentrates comprising comminuting and agitating green surface vegetation in water at a temperature below approximately 120° F., in the presence of at least one substance selected from the group consisting of sulfur dioxide, hydrogen sulfide and nascent hydrogen, and removing the indigestible fibrous substance thus obtained by filtration.

2. The process of manufacturing vitamin concentrates comprising comminuting and agitating green surface vegetation in water at a temperature below approximately 120° F., in the presence of at least one substance selected from the group consisting of sulfur dioxide, hydrogen sulfide and nascent hydrogen while maintaining the pH of the solution between the approximate limits of 3 and 6, and removing the indigestible fibrous substance thus obtained by filtration.

3. The method of manufacturing vitamin concentrates which comprises comminuting and agitating green surface vegetation in water at a temperature slightly above the freezing point of the solution in the presence of at least one substance selected from the group consisting of sulfur dioxide, hydrogen sulfide and nascent hydrogen, while the pH is maintained between the approximate limits of 3 and 6, and removing the indigestible fibrous substance thus obtained by filtration.

4. The method of manufacturing vitamin concentrates comprising comminuting and agitating green surface vegetation in water at a temperature below approximately 120° F., in the presence of at least one substance selected from the group consisting of sulfur dioxide, hydrogen sulfide and nascent hydrogen while the pH is maintained between the approximate limits of 3 and 6, filtering the resulting slurry and concentrating the resulting filtrate.

5. The method of manufacturing vitamin concentrates comprising comminuting and agitating green surface vegetation in water at a temperature below approximately 120° F., in the presence of nascent hydrogen, while maintaining the pH below a value of about 4.

6. The method of manufacturing vitamin concentrates comprising comminuting and agitating green surface vegetation in water at a temperature below approximately 120° F., in the presence of hydrogen sulfide, while maintaining the pH between approximately 4 and 8.3.

7. The method of manufacturing vitamin concentrates comprising comminuting and agitating green surface vegetation in water at a temperature below approximately 120° F., in the presence of sulfur dioxide, while maintaining the pH between approximately 3 and 6.

8. The method of manufacturing vitamin concentrates comprising comminuting and agitating green surface vegetation in water at a temperature below approximately 120° F., in the presence of a substance selected from the group consisting of sulfur dioxide, hydrogen sulfide and nascent hydrogen while maintaining the pH between the limits of about 3 and 6, filtering, heating to a temperature of approximately 130° F., removing a green chlorophyll-protein coagulate, and evaporating the resulting filtrate.

9. The method of manufacturing vitamin concentrates comprising comminuting and agitating green surface vegetation in water at a temperature below approximately 120° F., in the presence of a substance selected from the group consisting of sulfur dioxide, hydrogen sulfide and nascent hydrogen while maintaining the pH between the limits of about 3 and 6, filtering, heating the resulting filtrate to a temperature of approximately 130° F., removing a green chlorophyll-protein coagulate, heating the resulting filtrate to a temperature of approximately 160° F., removing a white albuminoid coagulate, and evaporating the resulting filtrate.

LEWIS WILSON SCHNABEL.

REFERENCES CITED

The following references are of record in the file of this patent:

UNITED STATES PATENTS

| Number | Name | Date |
|---|---|---|
| 2,131,394 | Test | Sept. 27, 1938 |
| 2,187,467 | Stuart | Jan. 16, 1940 |
| 2,282,054 | Hickman | May 5, 1942 |
| 2,297,212 | Gockel | Sept. 29, 1942 |
| 2,345,576 | Buxton | Apr. 4, 1944 |
| 2,438,554 | Freedman | Mar. 30, 1948 |

FOREIGN PATENTS

| Number | Country | Date |
|---|---|---|
| 329,369 | Great Britain | Oct. 2, 1929 |

OTHER REFERENCES

Brocklesby: Marine Animal Oils (1941), page 59. (Copy in Division 43.)

Rosenberg: Chemistry and Physiology of the Vitamins (1943), pages 291, 292. (Copy in Division 43.)

Sherman et al.: The Vitamins, 2nd edition (1931), pages 184, 185, 215, 216. (Copy in Division 43.)